FTD8008 OH X 9,461
MODIFICATION AVAILABLE
DRAFTSMAN
4305
J. Reed,
Saw-Mill Head-Block.
Patented Mar. 2, 1836.
9461 X
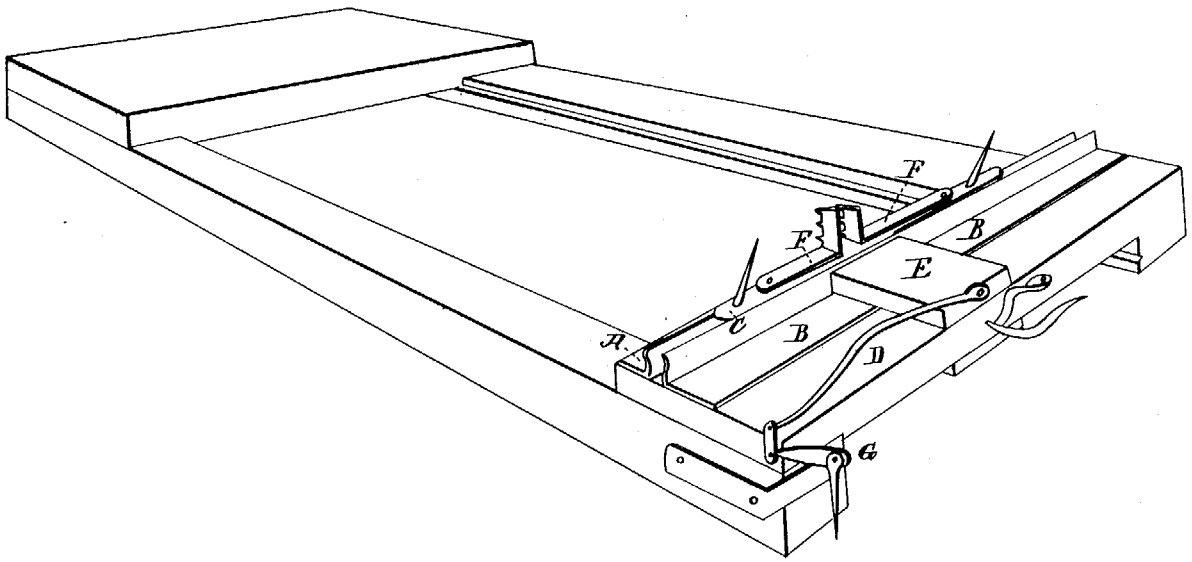
A.M. PHOTO-LITHO. CO. N.Y. (OSBORNE'S PROCESS.)
B Gust Jesse Reed 9461X
Letters Patent The schedule referred to in these Letters Patent and making part of the same containing a description in the words of the said Jesse Reed himself of his improvement in the Saw Mill Carriage Stake and Dog) —— ——

To all persons to whom these presents shall come. Be it known that I Jesse Reed of Marshfield in the County of Plymouth and Commonwealth of Massachusetts, Machinist, have invented and put into operation a new and useful improvement in the mode or manner of confining, moving and adjusting the log to be sawed, and which is described in the following words. The principle part of my improvement consists in slides a slider hand, lever knee brace and two right angle dogs. which are made of wrought or cast iron and are constructed and applied in the following manner. The slide plate A. is from four to five feet in length seven or eight inches in width and about half an inch in thickness except two inches of the front edge on which the dog slides. which is one inch.

The back edge is turned up two or three inches with a lip to receive the slider and to sustain one edge of it. The other slides B. B. are about two feet in length three or four inches in width. turned up in the same manner as the former to receive and support the other edge of the slider. The slider C. is about three feet in length. three inches in width. an inch in thickness. grooved in each edge for the slides. The under side of this slider is notched from end to end. allowing four notches to the inch and a quarter, thereby giving the inch board. The distances of these notches from each other may be increased or diminished as occasion may require. The [illegible]

9461X lever D. to which the hand is attached, whereby the slider
is moved is about three feet in length, of width and thick
ness sufficient for strength. At one end of this lever is an ax
is of about one foot in length two inches in diameter, and
at right angles with the aforesaid lever. The other end of
this axis is a crank of about three of or four inches in length
The hand E. is about eight or ten inches in length
three in width and three in thickness. In the middle
of this hand is a hole, one inch and a half in diameter
which is to receive one end of the crank by which said
hand is suspended. This hand is made of cast iron
with steel end fixed to the notches of the slider. under
the hand is a straight bail to which a weight is sus
pended. The dogs F. F. are right angles, the horizon
tal part of which are six teen inches in length three in
width, one in thickness. The perpendicular parts are each
nine inches in hight two and a half inches square.
In each of these are three or four holes in which wrought
iron or steel teeth are fastened for confining the log. these
dogs are fixed upon the slider by a swivel joint at the
outer ends. Two pieces of wrought iron are fastened, one
at each end of the slider sloped back at an angle of
forty five degrees. The lever G. is used for fixing the
logs, it is constructed with a lock joint, by which
the motion required is obtained, or this motion may be
obtained by a swivel brace about five feet in length
which is placed at an angle of about forty five degrees
in a mortice in a joint which lays parallel with car
riage. In the upper end of said brace is a mortice
to receive one end of a circular arm about one foot in
length, which is confined by a bolt. In the backward
motion of the carriage the lever D. comes in contact with
said brace, by which it is raised and the log is set.

By

By the joint of the circular arm in the brace, the car-
riage is permitted to pass forward, without giving mo-
tion to the lever. The application of the machinery
is as follows. Place the plate A. on the carriage
stock even with the inner edge. bolt it fast.
place the two other slides B.B. back of it so far as
to admit the slider C. to slide between them. bolt
them down also. Place the axis of the lever D. be-
tween the two short slides. let the crank and hand come
directly under the slider let the axis of the lever
be firmly hung in wood or iron, and let the long
arm of the lever D. extend a little without the car-
riage parallel with the plate. Place the knee E.
about the distance of the length of its horizontal part
back of the end of the lever of hight sufficient to
give the proper motion to the lever. A similar ap-
paratus may be used at the head stock. In using
this machine, the log is rolled on to its proper
place. the dogs are driven in and the crowbar dropp-
ed in the back of the dogs upon the sloped irons. by
which the log is firmly held. To change the mo-
tion of the slider, it is only necessary to depress one
end of the hand, and the weight. sliding on the bail
will throw the other end into the notches. With this
apparatus the log is held to be sawed into lumber of
any [illegible] with & without [illegible]
What I claim as my improvement is the notched
slider. the hand, weight and lever, the lock joint of
the knee the swivel brace the right angle dogs and
the method of confining them as above described, and
their arrangement. In testimony that the above
is a true specification of my said improvements as my-
me described, I have hereunto set my hand this twen-
tieth day of January 1836. Jesse Reed
Witnesses. N. Russell
Allen Danforth [1056 wds]

Exd
M.G.

Drawing ?

9461X

Isaac Knight, Letters Patent granted, dated March 18. 1829.
Reissued tenth day of July 1834 & Re-Reissued
April 28. 1836. — being for Impt. in the
Rail road Carriage — Recorded in volume
— 8th — page 105 — of Restored Records.